US005915515A

United States Patent [19]

Blair

[11] Patent Number: 5,915,515

[45] Date of Patent: Jun. 29, 1999

[54] DIE LIFTING MECHANISM

[76] Inventor: Rodney L. Blair, 11009 Dapple Way, Bakersfield, Calif. 93312

[21] Appl. No.: 08/870,550

[22] Filed: Jun. 6, 1997

Related U.S. Application Data

[63] Continuation-in-part of application No. 08/693,900, Aug. 5, 1996, abandoned.

[51] Int. Cl.$^6$ .................................................... B65G 13/00

[52] U.S. Cl. ...................................... 193/35 SS; 198/782

[58] Field of Search ......................... 193/35 SS; 198/782

[56] References Cited

U.S. PATENT DOCUMENTS

| | | | |
|---|---|---|---|
| 3,243,029 | 3/1966 | Oliver | 193/35 SS |
| 4,930,612 | 6/1990 | Thorndyke | 193/35 SS |
| 5,088,585 | 2/1992 | Lambert | 193/35 SS |

FOREIGN PATENT DOCUMENTS

| | | | |
|---|---|---|---|
| 307039 | 3/1989 | European Pat. Off. | 193/35 SS |
| 382017 | 8/1990 | European Pat. Off. | 193/35 SS |
| 1911849 | 10/1969 | Germany | 193/35 SS |
| 2648916 | 5/1977 | Germany | 193/35 SS |
| 236071 | 5/1986 | Netherlands | 193/35 SS |

*Primary Examiner*—James R. Bidwell
*Attorney, Agent, or Firm*—Robert M. M. Sperry

[57] ABSTRACT

An improved die lifting device comprising a plurality of roller-carrying cam mechanisms, actuable by a common hydraulic ram located externally of the die area, to provide strong, rapid, reliable operation, while occupying a minimum of space within the die area.

12 Claims, 8 Drawing Sheets

DIE LIFTING MECHANISM

RELATED CASES

This application is a Continuation-In-Part of my prior patent application Ser. No. 08/693,900, filed Aug. 5, 1996, and now abandoned.

FIELD OF INVENTION

This invention relates to machine tools and is particularly directed to improved means for lifting dies in high-power forging machines.

PRIOR ART

As is well known, high-power forging machines employ many thousand and even millions of pounds of pressure to forge blocks of metal into desired shapes. To accomplish this shaping, heavy duty dies are attached to the leading ends of pressure rams. A block of metal is then placed between the dies and the rams drive the dies together, forcing the metal to adapt to the shape of the dies. Often, the die area is heated to temperatures of several thousand degrees Farenheit to facilitate the ductility of the metal. Thus, the dies must be very heacily and strongly constructed, in order to withstand deformation due to the heat and pressure of the forging operation. Obviously, each shape requires a respective set of dies, Consequently, the die sets must be removed and replaced each time a new shape is to be forged. Unfortunately, the die area in most forging machines is quite small, providing insufficient space for fork lifts or the like to assist in inserting or removing the die sets. Thus, the die removal and replacement must be accomplished manually, which is an exteremely difficult, expensive and time-consuming operation, requiring 2–8 hours to perform and involving considerable loss of productivity, since the forging machine must remain out of operation during the die changing procedure.

To reduce the time and effort required for the die changing operation and, hence, to lessen the cost of the pprocedure and to increase the productivity of the forging machine, it has been proposed to mount die lifting devices in the die area. Accordingly, the bed of the press is usually formed with a plurality of parallel slots, formed in the shape of an inverted T and extending across the press bed. Die lifting devices have been designed which fit into these slots and which have rollers to facilitate insertion and removal of the dies. The die lifting devices of the prior art have employed a row of pistons, each carrying a ball to support the die, and having a hydraulic line extending beneath the row of pistons for actuation. Unfortunately, some die lifting devices are formed with a T-shaped configuration and must be inserted into the T-slots from the end of the die bed. However, access to the ends of the T-slots is often blocked by other equipment which, consequently, must be removed to insert or remove the die lifters. Furthermore, the hostile environment, created by the heat and pressure encountered in the die area, often causes the prior art die lifting devices to fail, due to deformation of the pistons or unequal distribution of the hydraulic fluid because of the heat. Thus, none of the prior art die lifting devices have been entirely satisfactory.

BRIEF SUMMARY AND OBJECTS OF INVENTION

These disadvantages of the prior art are overcome with the present invention and improved die lifting devices are provided which are simple, compact and economical in construction, yet are strong enough to withstand the hostile environment of the die area and provide strong, reliable operation for lifting dies to facilitate insertion and removal of the dies with minimum time, effort and expense.

These advantages of thepresent invention are preferably attained by providing improved die lifting devices comprising a plurality of roller-carrying cam mechanisms, actuable by a common hydraulic ram located externally of the die area, to provide strong, rapid, reliable operation, while being rectangular in cross section and dimensioned to allow insertion and removal vertically into and out of the T-slots of the die bed.

Accordingly, it is an object of the present invention to provide an improved die lifting device.

Another object of the present invention is to provide an improved die lifting device which is simple, compact and economical in construction.

An additional object of the present invention is to provide an improved die lifting device which is strong enough to withstand the hostile environment of the die area.

A further object of the present invention is to provide an improved die lifting device which provides strong, rapid and reliable operation for lifting dies.

Another object of the present invention is to provide an improved die lifting device which facilitate insertion and removal of the dies with minimum time, effort and expense.

A specific object of the present invention is to provide an improved die lifting device comprising a plurality of roller-carrying cam mechanisms, actuable by a common hydraulic ram located externally of the die area, to provide strong, rapid, reliable operation, while being rectangular in cross section and dimensioned to allow insertion and removal vertically into and out of the T-slots of the die bed.

These and other objects and features of the present invention will be apparent from the following detailed description, taken with reference to the figures of the accompanying drawing.

BRIEF DESCRIPTION OF THE DRAWING

FIG. 14 is an enlarged view showing a detail of the connection of the handle and cam with the die lifting device of FIGS. 11–13.

DETAILED DESCRIPTION OF THE INVENTION

Figure 1:
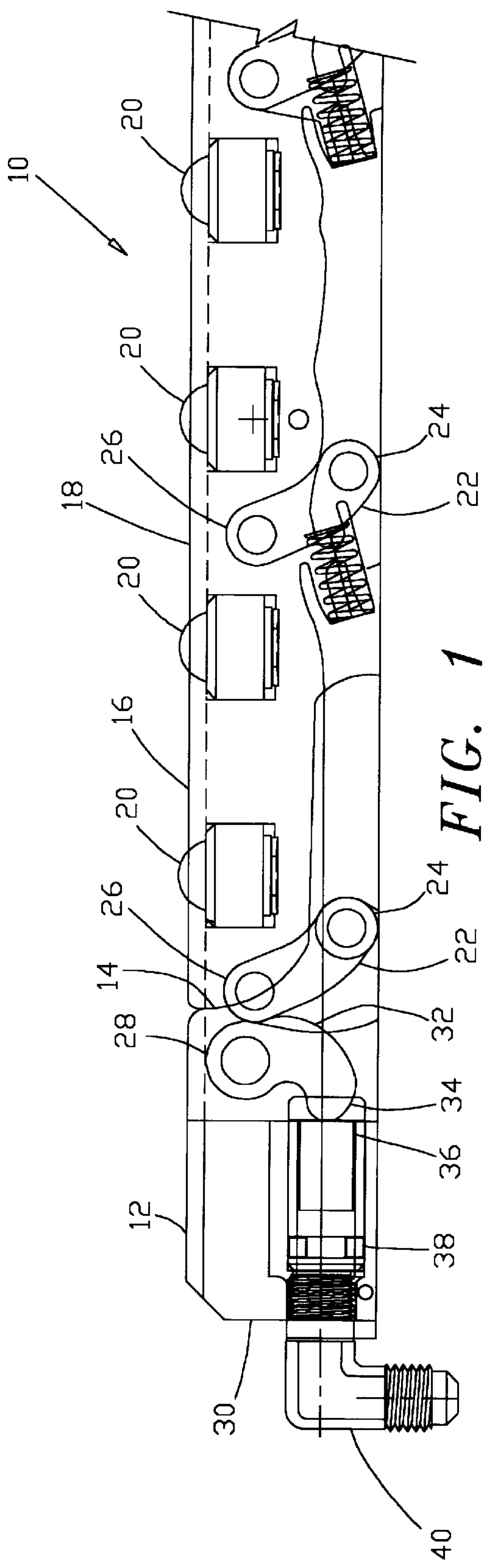
FIG. 1 is a vertical section through a die lifting device embodying the present invention, showing the cam mechanisms in the lowered position.

In that form of the present invention chosen for purposes of illustration in FIG. 1, a die lifting device is shown, indicated generally at 10, having a generally U-shaped piston block 12 with a recess 14 formed in the upper surface 16 of the piston block 12. A roller block 18 is slideably mounted in the recess 14 and carries a plurality of rollers 20 which each project slightly above the upper surface 16 of the piston block 12, as best seen in FIG. 1. Within the piston block 12 are a plurality of arcuate or kidney-shaped cam members 22, which each have their lower end 24 pivotally connected to the piston block 12 and have their upper end 26 pivotally connected to the roller block 18. A comma-shaped cam member 28 is pivotally mounted on the piston block 12 adjacent the left end 30 of the piston block 12 and has a somewhat helical outer surface 32 with its tip 34 projecting downward, as best seen in FIG. 1, and a piston 36 is slideably mounted in a passage 38 which is supplied with hydraulic fluid through conduit 40 from a suitable source, not shown.

Figure 3:
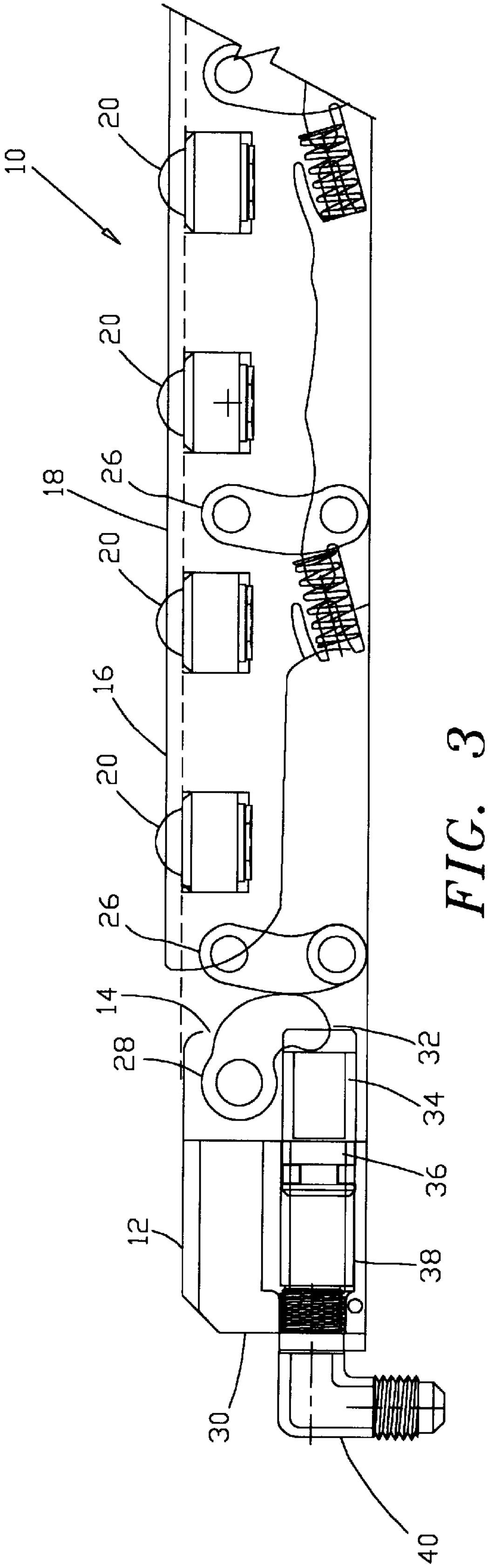
FIG. 3 is a view, similar to that of FIG. 1, showing the cam mechanisms in the raised position.

In use, the die lifting device 10 sits on the platform of the press, in the retracted position shown in FIG. 1. However, when it is desired to lift the die, for removal or exchange, hydraulic fluid is delivered through conduit 40 to drive the piston 36 toward the right, as seen in FIG. 1, causing the piston 36 to engage tip 34 of the comma-shaped cam member 28 causing the comma-shaped cam member 28 to rotate. As comma-shaped cam member 28 rotates, its somewhat helical outer surface 32 bears against the nearest one of the arcuate cam members 22 forcing the arcuate cam members 22 to rotate and, hence, to lift roller block 18 to an elevated position, as best seen in FIG. 3, to raise the die, not shown, which is supported on the rollers 20 and to facilitate removal and replacement of the die. Due to the curvature of the somewhat helical outer surface 32, even slight movement of tip 34 by the piston 36 causes the comma-shaped cam member 28 to deliver very significant force to the arcuate cam member 22 and, hence, to deliver a very large lifting force to lift the roller block 18 and to raise the die, not shown. Furthermore, due to the configuration of the die lifting device 10, only a single hydraulic conduit 40 is required which serves to minimize the size of the die lifting device 10.

Figure 2:
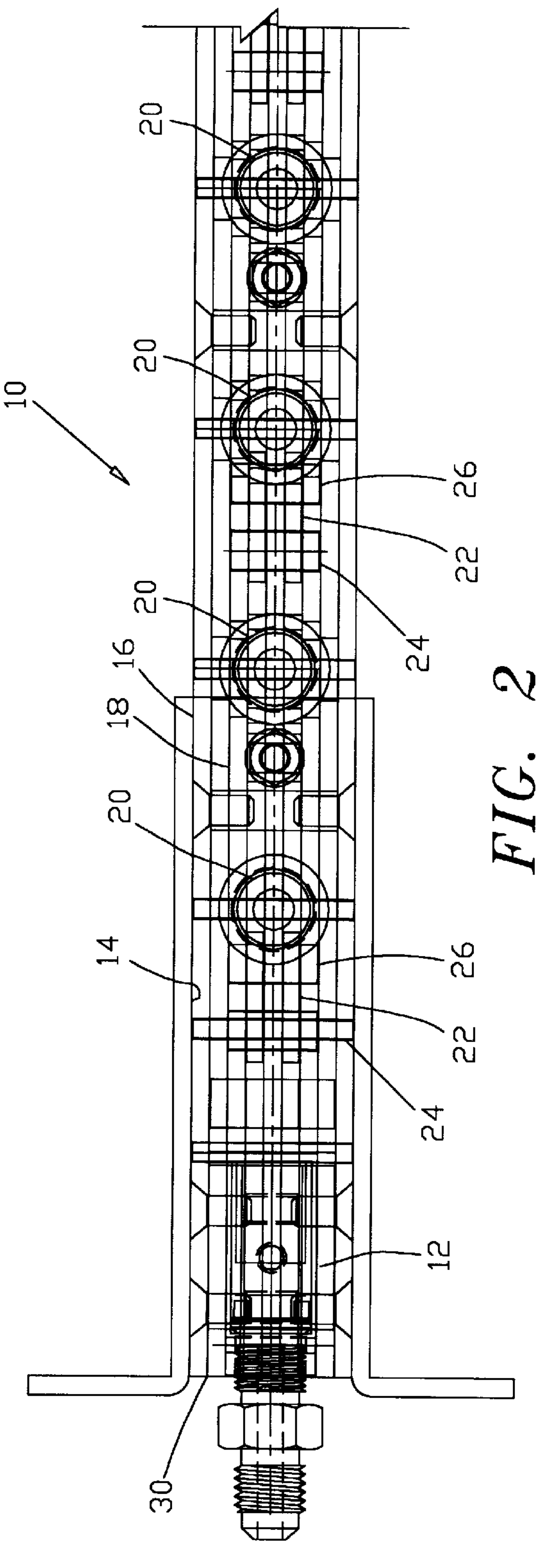
FIG. 2 is a plan view of the die lifting device of FIG. 1.
Figure 4:
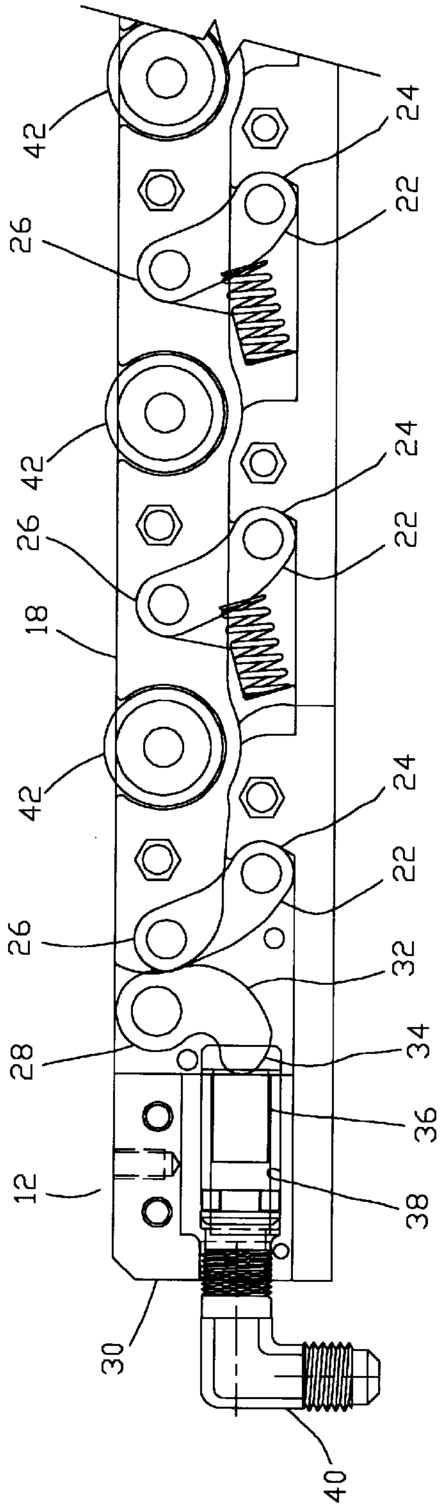
FIG. 4 is a view, similar to that of FIG. 1, showing an alternative form of the die lifting device of FIG. 1.
Figure 5:
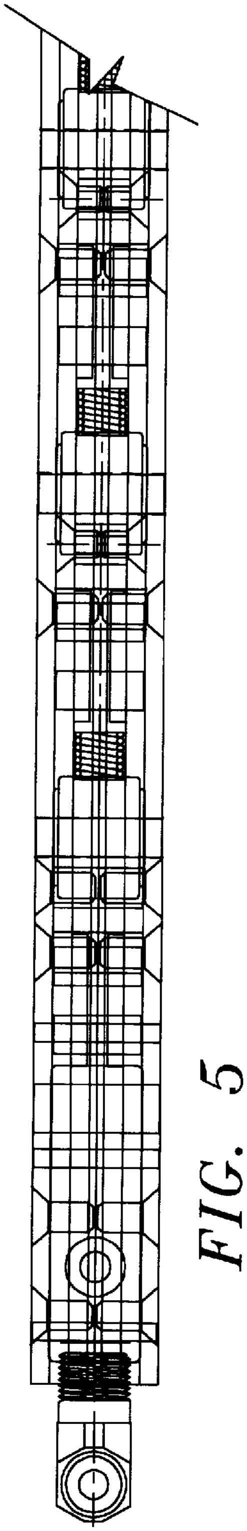
FIG. 5 is a plan view of the die lifting device of FIG. 4.

FIGS. 4 and 5 show an alternative form of the die lifting device 10 in which the rollers 20 are replaced by wheels 42 which are pivotally mounted on the roller block 18. This form of the present invention functions in the same manner as described above for the form of FIGS. 1–3.

Figure 7:
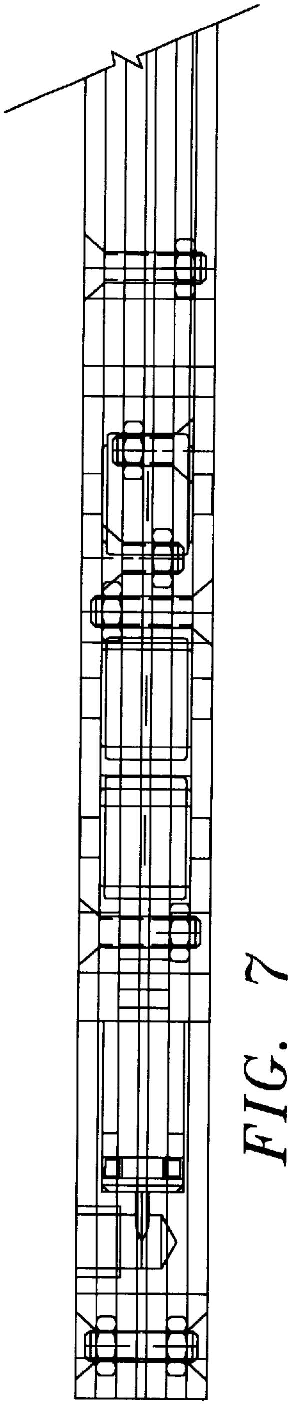
FIG. 7 is a plan view of the die lifting device of FIG. 6.
Figure 6:
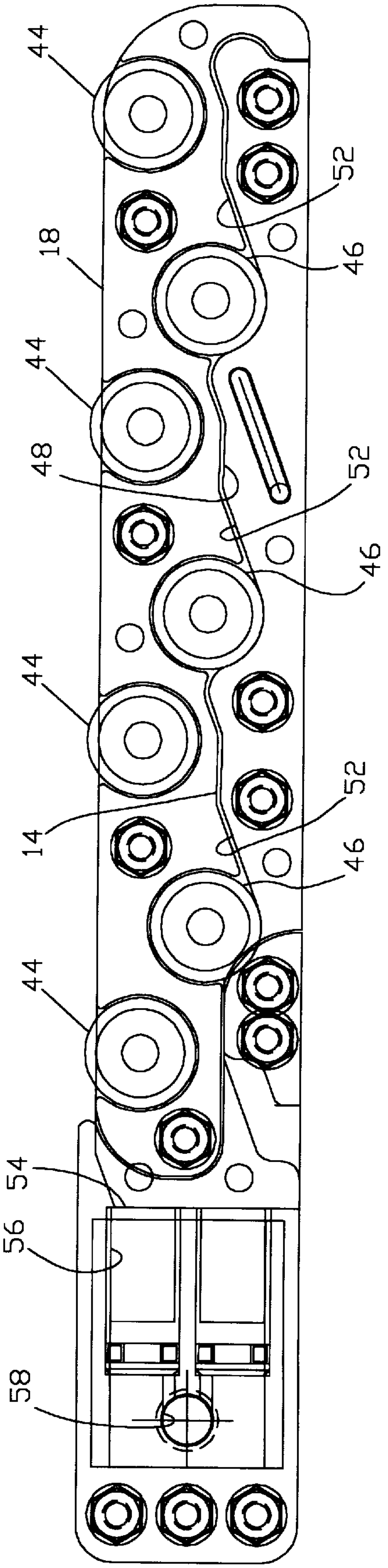
FIG. 6 is a view, similar to that of FIG. 1, showing another alternative form of the die lifting device of FIG. 1.

FIGS. 6 and 7 show another alternative form of the die lifting device 10 is which the roller block 18 carries a plurality of upper wheels 44 which project slightly above the upper surface 16 of the piston block 12 and carries a plurality of lower wheels 46 which project below the lower surface 48 of the roller block 18 and engage the upper surface 50 of recess 14 which is formed with a series of camming ramp portions 52. Piston 54 is slideablw in passage 56 and is driven by hydraulic fluid supplied through conduit 58 from a suitable source, not shown.

In use, when hydraulic fluid is delliver through conduit 58 to piston 54, it drives the piston 54 to the right, as seen in FIGS. 6 and 7, bearing against the roller block 18 and causing lower wheels 46 to ride upward on the ramp portions 52 of recess 14, thereby raising roller block 18 and upper wheels 42 above the upper surface 16 of the piston block 12 to raise a die, not shown, supported on the upper wheels 42.

Figure 8:
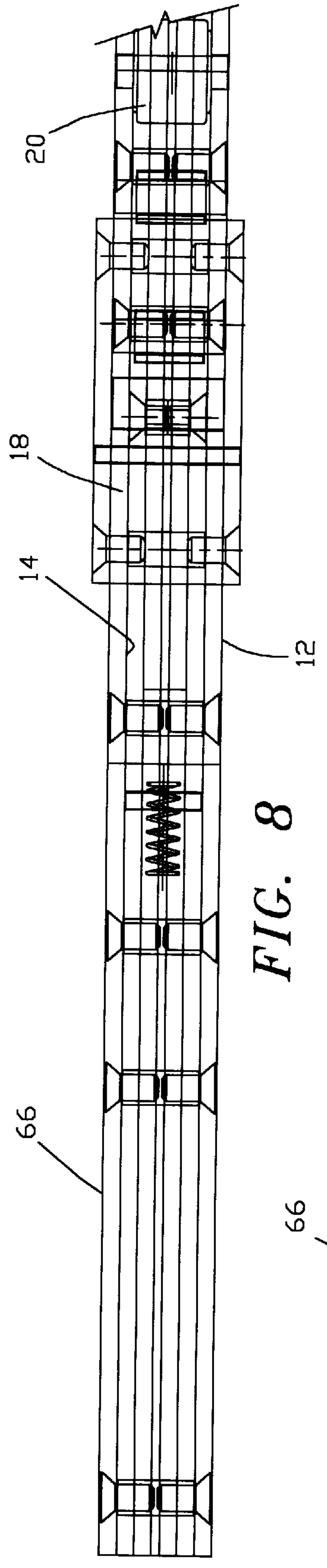
FIG. 8 is a plan view of another alternative form of the die lifting device of FIG. 1.
Figure 9:
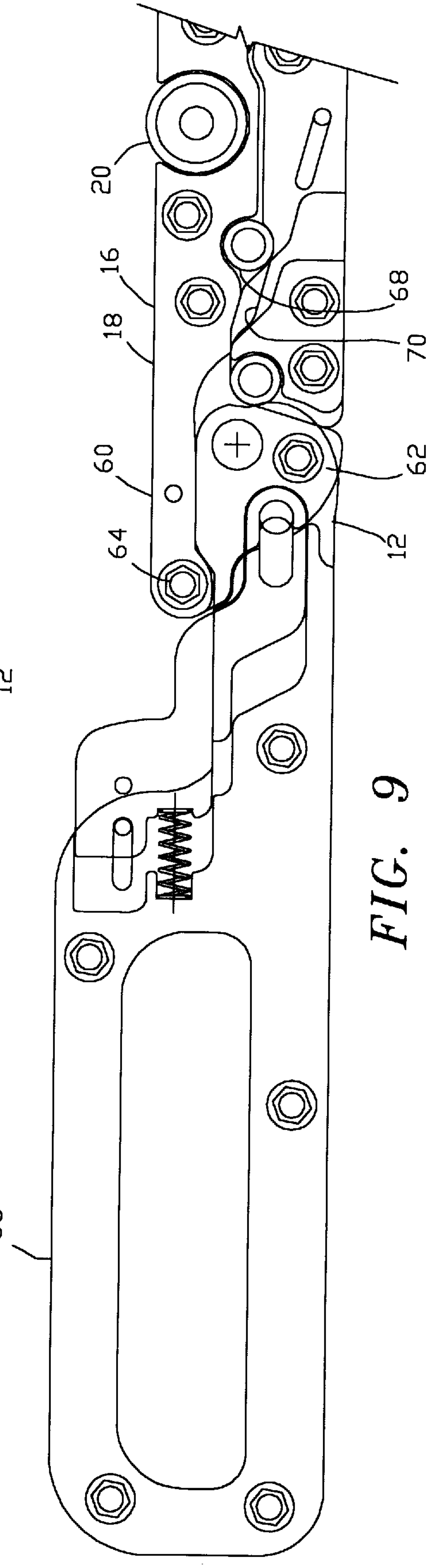
FIG. 9 is a side view of the die lifting device of FIG. 8, shown in the lowered position.
Figure 10:
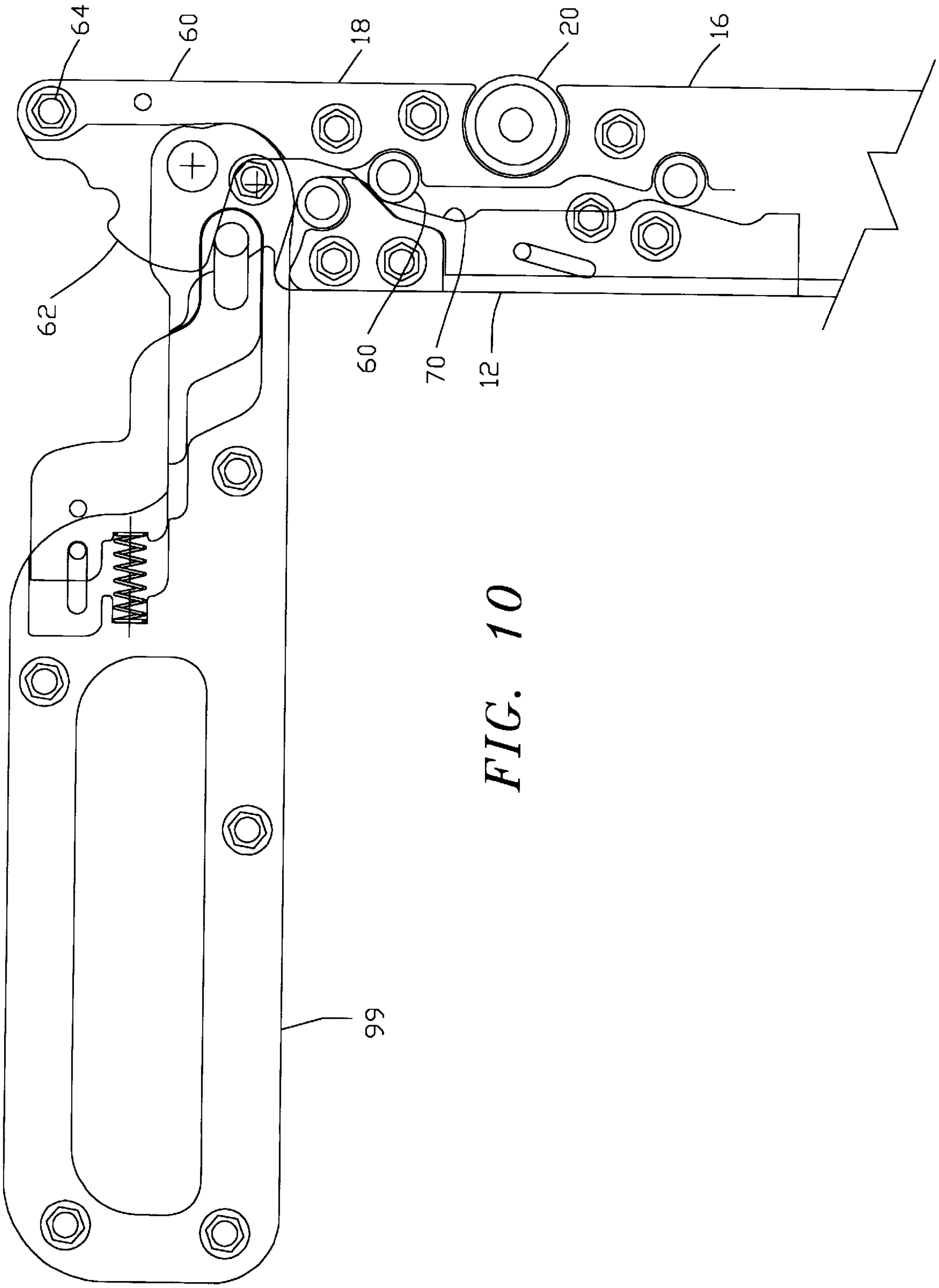
FIG. 10 is a side view of the die lifting device of FIG. 8, shown in the die lifting position.

FIGS. 8–10 show an alternative form of the die lifting device of the present invention which is manually operable. In this form of the present invention, the roller block 18 has a projection 60 which is coupled to cam member 62 by pin 64. Cam member 62 carries a handle 66 which serves to rotate the cam member 62, as seen in FIG. 10. The roller block 18 is supported by rollers 68 and rotation of handle 66 and cam member 62 is formed with a cam surface 63 which bears against roller 65 which is mounted on the piston block 12. Movement of handle 66 causes rotation of cam member 62 and causes cam surface 63 to bear against roller 65 which causes the rollers 68 ro ride up cam surface 70 of piston block 12 to lift the roller block 18 to the die lifting position, as seen in FIG. 10.

In use, the operator grasps handle 66 and moves the handle 66 to the lowered position, seen in FIG. 10, which rotates cam member 62 and, hence, serves to cause rollers 68 of roller block 18 to ride up the cam surface 70 of piston block 12 and, hence, to lift the die. Returning handle 66 to the raised position of FIG. 8 causes rollers 68 of roller block 18 to ride down the cam surface 70 and, thereby returns roller block 18 and the die to the lowered position.

Figure 11:
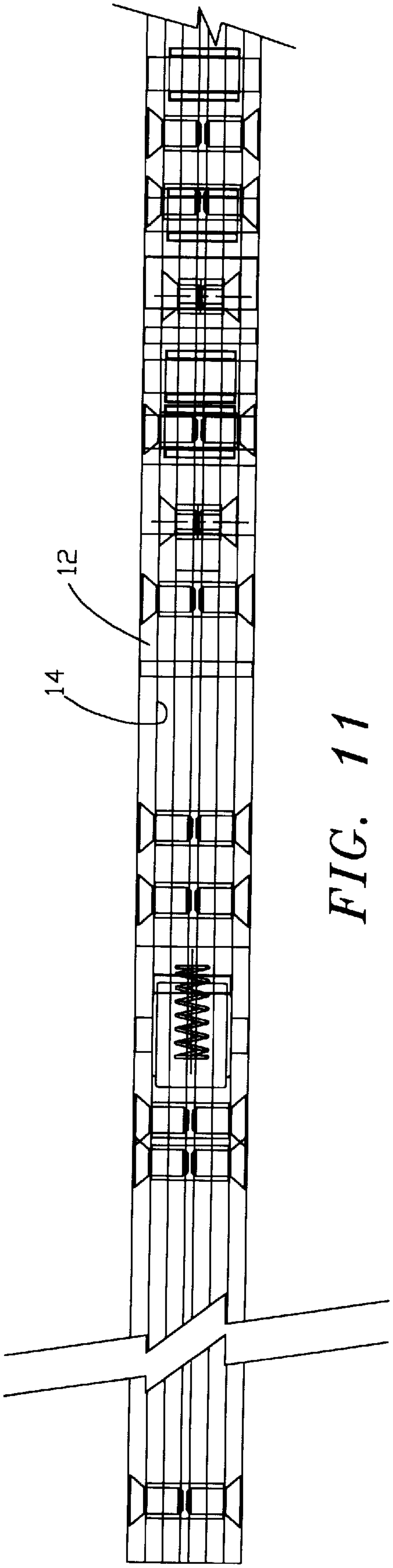
FIG. 11 is a plan view of an additional alternative form of the die lifting device of FIG. 1.
Figure 12:
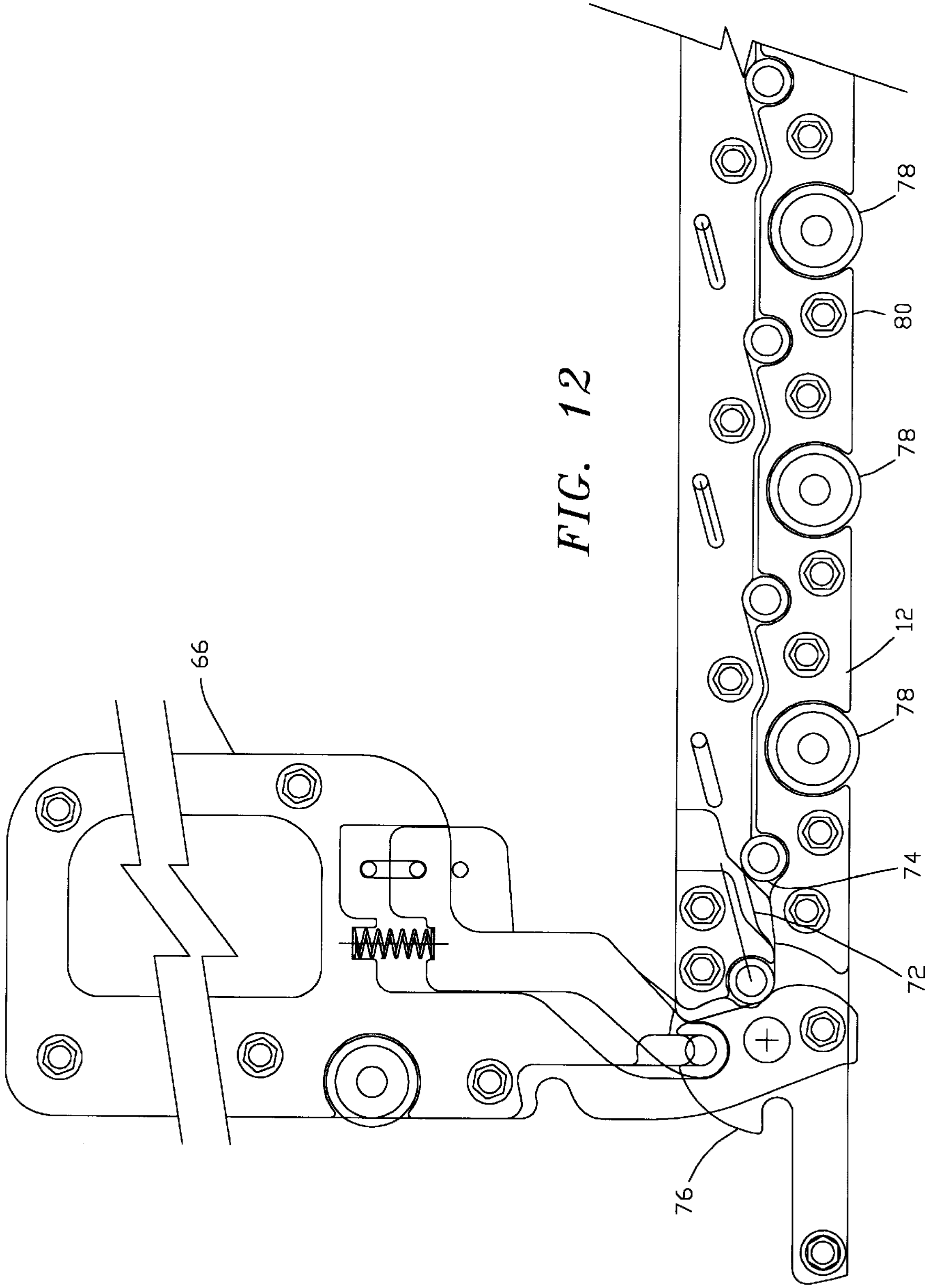
FIG. 12 is a side view of the die lifting device of FIG. 11, shown in the lowered position.
Figure 13:
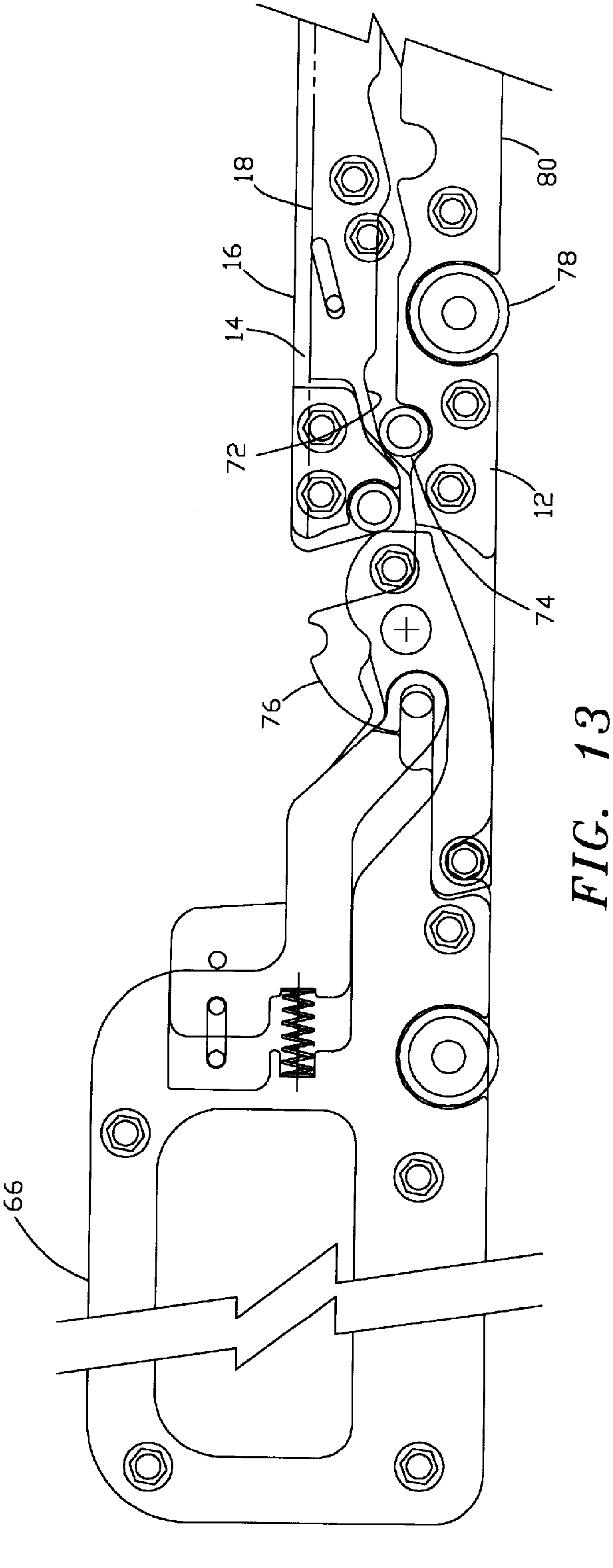
FIG. 13 is a side view of the die lifting device of FIG. 11, shown in the lifting position.

FIGS. 11–13 show another manual form of the die lifting device of FIG. 1. In this form of the present invention, the roller block 18 is formed with a camming surface 72 which rides on rolleers 74 carried by the piston block 12. Cam member 76 is connected to the forward end 78 of the roller block 18 and is rotatable be handle 66 between a first or lowered positon, as seen in FIG. 12, and a second or raised position, as seen in FIG. 13. Moving handle 66 from the raised position of FIG. 12 to the position of FIG. 13 causes rotation of cam member 76 which causes the cam surface 77 of cam member 76 to bear against roller 79, carried by roller block 18 and serves to push the roller block 18 to the right, causing the cam surfaces 72 of roller block 18 to ride upward on rollers 74 of piston block 12 to the raised position seen in FIG. 13 and to lift the roller block 18 and the die carried thereby to the raised position of FIG. 13. Also. in this form of the present invention, the piston block 12 is provided with wheels 78 which project below the bottom surface 80 of the piston block 12. Consequently, a die can be placed on the die lifting device of FIGS. 11–13 outside of the die cavity, not shown, and can be rolled into the die cavity where it can be raised into the active position by lowering handle 66.

As best seen in FIG. 14, the cam surface 77 is formed such that, as handle 66 rotates the cam member 76, the line of force always lies along arrow 80, joining the center of the pivot pin 81 for cam member 76 with the center of the roller 79. This ensures that the cam member 76 will drive roller block 12 laterally, without any upward movement, and hence, ensures smooth operation of the die lifting device. Similarly, in the form of the invention shown in FIGS. 8–10, cam surface 63 of cam member 62 is formed such that, as handle 66 rotates cam member 62, the line of force always lies along the line joining pivot pin 67 of cam member 62 with the center of roller 65.

Obviously, numerous variations and modifications can be made without departing from the spirit of the present invention. Therefore, it should be clearly understood that the forms of the preswent invention described above and shown in the figures of the accompanying drawing are illustrative only and are not intended to limit the scope of the present invention.

What is claimed is:

1. A die lifting device comprising:

a generally U-shaped piston block having an upper surface formed with a recess, a roller block slideably mounted in said recess, a plurality of anti-friction devices carried by said roller block, a piston slideably mounted in a passage formed in said piston block and in substantial alignment with said roller block, means for actuating said piston, and cam means operable by said piston to raise and lower said roller block.

2. The die lifting device of claim 1 wherein:

said anti-friction devices are balls.

3. The die lifting device of claim 1 wherein:

said anit-friction devices are wheels.

4. A die lifting device comprising:

a generally U-shaped piston block having an upper surface formed with a recess and having a passage formed in said block communicating with one end of said block, a roller block slideably mounted in said recess, a plurality of anti-friction devices carried by said roller block, a piston slideably mounted in a passage formed in said piston block, means for actuating said piston, cam means operable by said piston to raise and lower said roller block, and said cam means includes a plurality of arcuate cam members each having one end pivotally connected to said piston block and having the other end pivotally connected to said roller block.

5. A die lifting device comprising:

a generally U-shaped piston block having an upper surface formed with a recess, a roller block slideably mounted in said recess, a plurality of anti-friction devices carried by said roller block, a piston slideably mounted in a passage formed in said piston block, means for actuating said piston, and cam means operable by said piston to raise and lower said roller block, said cam means including a generally comma-shaped cam member.

6. The die lifting device of claim 5 wherein:

said comma-shaped cam member has a somewhat helical outer surface.

7. The die lifting device of claim 5 wherein:

said comma-shaped cam member has a tip engageable by said piston to rotate said cam member.

8. The die lifting device of claim 1 wherein:

said cam means comprises a plurality of ramp portion formed on the upper surface of said recess, and said roller block carries a plurality of wheels engageable with said ramp portion to facilitate movement of said roller block with respect to said ramp portions.

9. The device of claim 1 wherein:

said means for actuating said piston is manually operable.

10. The device of claim 1 further comprising:

said piston block is supported by wheels for moving said die lifting device into and out of a die cavity.

11. The die lifting device of claim 9 wherein:

said means for actuating said piston includes a cam mounted by a pivot pin on said manually operable means, and a roller mounted on said roller block movable by the cam on said manually operable means.

12. The die lifting device of claim 11 wherein:

said cam has a surface such that the line of force always lies along the arrow joining the center of the pivot pin for said cam with the center of the roller on said roller block.

* * * * *